No. 627,358.  
A. W. STANDING.  
RAILWAY TARIFF, &c.  
(Application filed June 23, 1898.)

Patented June 20, 1899.

(No Model.)  
Fig. I.

2 Sheets—Sheet I.  
Authority No. C. 7588.

THE .............. ............ RAILWAY COMPANY.
LUMBER TARIFF No. 2017.

Effective October 1st, 1894.          Page 3          Rates in Cents per One Hundred Pounds.

| ROUTING. | Authority for Changes. | | | | FROM / TO | Group 1. | Group 2. | Group 3. | Group 4. | Group 5. | Group 6. | Group 7. |
|---|---|---|---|---|---|---|---|---|---|---|---|---|
| | Route. | Rate. | Special | Commodities | | | | | | | | |
| 1. | | | | | Abby Dell................Ind. | 17 | 19 | 19½ | 20 | 20 | 21 | 24 |
| g. k. l. n. | | | | | Abingdon................Ills. | 15 | 17 | 17½ | 18 | 18 | 19 | 22 |
| b. l. | | | | | Abote..................Ind. | 17 | 17 | 19½ | 20 | 20 | 21 | 24 |
| l. m. | | | | | Acton....................." | 15 | 17 | 17½ | 18 | 18 | 19 | 22 |
| l. m. | | | | | Adams (Decatur Co.)......" | 15 | 17 | 17½ | 18 | 18 | 19 | 22 |
| c. l. | | | | | Adams Mills..............Ohio | 20 | 22 | 22½ | 23 | 23 | 24 | 27 |
| k. n. | | | | | Adair....................Ills. | 15 | 17 | 17½ | 18 | 18 | 19 | 22 |
| l. m. | | | | | Addison..................Ohio | 20 | 22 | 22½ | 23 | 23 | 24 | 27 |
| l. m. | | | | | Addyston................." | 16 | 18 | 18½ | 19 | 19 | 20 | 23 |
| b. c. d. l. m. | | | | | Adrian..................Mich. | 18 | 20 | 20½ | 21 | 21 | 22 | 25 |
| b. c. d. e. f. l. | | | | | Adrian..................Ohio | 18 | 20 | 20½ | 21 | 21 | 22 | 25 |
| k. n. | | | | | Adrian..................Ills. | 16 | 18 | 18½ | 19 | 20 | 20 | 23 |
| c. d. l. m. | | | | | Advance................Ind. | 15 | 17 | 17½ | 18 | 18 | 19 | 22 |
| l. | | | | | Advance................Ills. | 14 | 16 | 16½ | 17 | 17 | 18 | 21 |
| c. d. m. | | | | | Aetna...................." | 14 | 16 | 16½ | 17 | 17 | 18 | 21 |
| c. d. l. m. | | | | | Agosta..................Ohio | 18 | 20 | 20½ | 21 | 21 | 22 | 25 |
| c. d. l. m. | | | | | Ainsworth...............Ind. | 16 | 18 | 18½ | 19 | 19 | 20 | 23 |
| l. m. | | | | | Air Hill.................Ohio | 16 | 18 | 18½ | 19 | 19 | 20 | 23 |
| b. c. d. e. f. g. l. m | | | | | Akron....................." | 20 | 22 | 22½ | 23 | 23 | 24 | 27 |
| b. d. l. m. | | | | | Akron..................Ind. | 16 | 18 | 18½ | 19 | 19 | 20 | 23 |
| c. d. f. l. m. | | | | | Albany..................." | 17 | 19 | 19½ | 20 | 20 | 21 | 24 |
| l. m. | | | | | Albany..................Ohio | 20 | 22 | 22½ | 23 | 23 | 24 | 27 |
| l. m. | | | | | Albion..................Ind. | 17 | 19 | 19½ | 20 | 20 | 21 | 24 |
| h. l. | | | | | Albion..................Ills. | 14 | 16 | 16½ | 17 | 17 | 18 | 21 |
| b. c. d. l. m. | | | | | Albion..................Mich. | 18 | 20 | 20½ | 21 | 21 | 22 | 25 |
| b. d. l. m. | | | | | Aldine..................Ind. | 16 | 18 | 18½ | 19 | 19 | 20 | 23 |
| k. n. | | | | | Aledo..................Ills. | 15 | 17 | 17½ | 18 | 18 | 19 | 22 |
| b. | | | | | Alexander................" | 16 | 16 | 16½ | 17 | 17 | 18 | 21 |
| b. c. d. f. g. l. m. | | | | | Alexandria..............Ind. | 16 | 18 | 18½ | 19 | 19 | 20 | 23 |
| b. c. d. e. f. l. m. | | | | | Alexandria..............Ohio | 18 | 20 | 20½ | 21 | 21 | 22 | 25 |
| k. m. n. | | | | | Alexis..................Ills. | 15 | 17 | 17½ | 18 | 18 | 19 | 22 |
| f. l. m. | | | | | Alhambra................." | 14 | 16 | 16 | 16 | 17 | 18 | 21 |
| l. | | | | | Alice...................Ohio | 20 | 22 | 22½ | 23 | 23 | 24 | 27 |
| b. c. d. l. m. | | | | | Alida..................Ind. | 16 | 18 | 18½ | 19 | 19 | 20 | 23 |
| b. c. d. f. l. m. | | | | | Alger..................Ohio | 18 | 20 | 20½ | 21 | 21 | 22 | 25 |
| a. b. c. d. e. f. g. h. l. m. | | | | | Allegan................Mich. | 20 | 22 | 22½ | 23 | 24 | 24 | 27 |
| l. m. | | | | | Allegheny................Pa. | 23½ | 25½ | 26 | 26½ | 27½ | 27½ | 30½ |
| l. | | | | | Allendale...............Ills. | 11 | 13 | 13½ | 14 | 14 | 15 | 18 |
| l. m. | | | | | Allentown..............Ohio | 20 | 22 | 22½ | 23 | 23 | 24 | 27 |

Where no data is shown in the "Authority for Changes" column, the routing, rates, etc., are effective with date of tariff.

Witnesses.  
*G. A. Breubenschmidt*  
*E. S. Knight*

Inventor:  
*Amos W. Standing.*  
By *Knight Bro.*  
Attorneys

No. 627,358.

A. W. STANDING.

RAILWAY TARIFF, &c.

(Application filed June 23, 1898.)

Patented June 20, 1899.

(No Model.)

2 Sheets—Sheet 2.

Authority No. C. 7586.

Fig. II.

THE .............. .............. RAILWAY COMPANY.

LUMBER TARIFF No. 2017.

Effective October 1st, 1894.     Page 3.     Rates in Cents per One Hundred Pounds.

| ROUTING. | Authority for Changes. | | | | FROM / TO | Group 1. | Group 2. | Group 3. | Group 4. | Group 5. | Group 6. | Group 7. |
| --- | --- | --- | --- | --- | --- | --- | --- | --- | --- | --- | --- | --- |
| | Route. | Rate. | Special | Commodity | | | | | | | | |
| g. k. l. m. n. | C13034 Apl 10, 95 | | | | Abby Dell..............Ind. | | | | | | | |
| | | | | | Abingdon..............Ills. | | | | | | | |
| | | | | | Abote..............Ind. | | | | | | | |
| | | | | | Acton.............. " | | | | | | | |
| | | | | | Adams (Decatur Co.).......... " | | | | | | | |
| | | | | | Adams Mills..............Ohio | | | | | | | |
| | | | | | Adair..............Ills. | | | | | | | |
| | | | | | Addison..............Ohio | | | | | | | |
| | | | | | Addyston.............. " | | | | | | | |
| | | | | | Adrian..............Mich. | | | | | | | |
| | | | | | Adrian..............Ohio | | | | | | | |
| | | C13034 Apl 10, 93 | | | Adrian..............Ills. | 16 | 18 | 18 | 18½ | 19 | 20 | 23 |
| | | | | | Advance..............Ind. | | | | | | | |
| | | | | | Advance..............Ills. | | | | | | | |
| b. | C19224 Feb 28, 93 | | | | Aetna.............. " | | | | | | | |
| | | | | | Agosta..............Ohio | | | | | | | |
| | | | | | Ainsworth..............Ind. | | | | | | | |
| | | | | | Air Hill..............Ohio | | | | | | | |
| | | | | | Akron.............. " | | | | | | | |
| | | | | | Akron..............Ind. | | | | | | | |
| | | | | | Albany.............. " | | | | | | | |
| | | | | | Albany..............Ohio | | | | | | | |
| | | | | | Albion..............Ind. | | | | | | | |
| | | | | | Albion..............Ills. | | | | | | | |
| | | | | | Albion..............Mich. | | | | | | | |
| | | | | | Aldine..............Ind. | | | | | | | |
| | | | | | Aledo..............Ills. | | | | | | | |
| | | | | | Alexander.............. " | | | | | | | |
| | | | | | Alexandria..............Ind. | | | | | | | |
| | | | | | Alexandria..............Ohio | | | | | | | |
| | | | | | Alexis..............Ills. | | | | | | | |
| j. l. m. | C19697 Apl 25, 93 | C19697 Apl 25, 93 | | | Alhambra.............. " | 14 | 15½ | 15½ | 15½ | 16½ | 17½ | 20½ |
| | | | | | Alice..............Ohio | | | | | | | |
| | | | | | Alida..............Ind. | | | | | | | |
| | | | | | Alger..............Ohio | | | | | | | |
| | | | | | Allegan..............Mich. | | | | | | | |
| | | C16091 Mch 4, 97 | | | Allegheny..............Pa. | 24 | 26 | 26½ | 27 | 27 | 28 | 31 |
| | | | | | Allendale..............Ills. | | | | | | | |
| | | C14899 Oct 4, 96 | | | Allentown..............Ohio | 17 | 19 | 19½ | 20 | 20 | 21 | 24 |

Where no data is shown in the "Authority for Changes" column, the routing, rates, etc., are effective with date of tariff.

Witnesses.

D. A. Raubeschmidt,
E. S. Knight

Inventor:
Amos W. Standing
By Wright & Ford
Attorneys

UNITED STATES PATENT OFFICE.

AMOS W. STANDING, OF ST. LOUIS, MISSOURI.

RAILWAY-TARIFF, &c.

SPECIFICATION forming part of Letters Patent No. 627,358, dated June 20, 1899.

Application filed June 23, 1898. Serial No. 684,297. (No model.)

*To all whom it may concern:*

Be it known that I, AMOS W. STANDING, a citizen of the United States, residing at the city of St. Louis, in the State of Missouri, have invented certain new and useful Improvements in Perpetual or Continuous Railway-Tariffs, &c., of which the following is a full, clear, and exact description, reference being had to the accompanying drawings, forming part of this specification.

Railway companies, for the guidance of their employees and for the information of the public in general, issue freight and passenger tariffs showing routes, rates, &c., and also showing freight classifications, so that the articles to be forwarded may be properly classified and the proper rates used. Changes are constantly being made in these routes, rates, &c., and the roads issue new or revised sheets which they send to the various employees and other parties possessed of the original tariffs, and when the revisions become so numerous as to be too burdensome new and complete tariffs are again issued. When these revised sheets are received, the original tariff-books have to be corrected, which involves a vast amount of labor when taken as a whole.

It is the object of my invention to simplify this work and reduce the labor to a minimum, while at the same time to present always in collected arrangement rates or other data revised up to date and to have associated with such rates or data the reference to authority for them, as well as the dates on which they were respectively made effective, avoiding many possibilities of mistakes which are constantly arising under the old method and for which a corps of clerks have to be kept to correct the mistakes that are constantly being made.

My invention consists in features of novelty hereinafter fully described, and pointed out in the claims.

Figure I illustrates a page of a railway-tariff such as is designed to be originally issued in carrying out my invention, these pages or sheets being placed in a suitable cover, file, or temporary binder. Fig. II represents a page or sheet where certain changes have been made in the routing or rating and the authority for the change appearing opposite thereto.

By referring to Fig. I there is to be seen one of the sheets or pages of the tariff as originally issued, such sheet stating when the tariff went into effect and the authority for the tariff. These sheets are originally sent out in complete form to the different employees of a railroad, and heretofore they have generally been sent in the form of a bound book or volume, with the authority appearing on the front cover of the book. Fig. I is not unlike a sheet or page of a tariff-book as heretofore used, except in the old form there did not appear the columns at the left of Fig. I, over which appear the words "Authority for changes," nor did the sheets in the old form each contain the authority, as this appeared on the front cover of the book.

As stated, changes are being frequently made by railroads in the routing, rating, &c., of their tariffs, and to avoid the vast amount of labor and the danger of making mistakes which have existed under the old method of making amendments or changes is the prime object of my invention.

One form of carrying out my invention is illustrated by Fig. II of the drawings, whereon there appear three corrections in the routing illustrated in Fig. I, these changes in the routing being illustrated by the use of the letters "g, k, l, m, n," in lieu of the letters "g, k, l, n," opposite the name "Abingdon," and the use of the letter "b" in lieu of the letters "c, d, m," opposite the name "Ætna," and the use of the letters "j, l, m," in lieu of the letters "f, l, m," opposite the name "Alhambra." Fig. II also shows changes in the rating, these changes being shown on the right-hand side of the figure, opposite the names "Adrian," "Alhambra," "Allegheny," and "Allentown." Whenever such a change is made in the routing or rating, it is necessary to give the authority for the change. This is shown in Fig. II in the column under the words "Authority for changes," the authority for changes in the routing being given in the column indicated by the word "Route," the number indicating the authority and the date of the change appearing opposite the letters indicating the changes in routing which have been referred to. The authority for the changes in the rating is placed in the column marked "Rate" and is placed opposite the numerals referred to on the right-hand side of the figure as indicating the change in rating. Fig. II assumes that there has been a change made in the routing from a given point to Abingdon, Illinois, Ætna, Illinois, and Alhambra, Illinois, and a change in the rates from a given point to Adrian, Illinois, Alhambra, Illinois, Allegheny, Pennsylvania, and Allentown, Ohio. I have omitted the routing and the numerals indicating the rating where no corrections have been made; but in practice the same letters and numerals would appear on the sheet opposite the places where no changes have been made as do appear on Fig. I.

Whenever a change is made by a railroad company either in the routing or rating, or both, the sheet of the tariff containing such change is reprinted with the desired amendments or changes and a sheet sent to each employee having one of the tariffs, and each employee simply has to substitute the corrected or amended sheet for the corresponding sheet found in his tariff, and in this way he always has before him a correct and continuous tariff without having to make changes in the original tariff or make references to certain amendments or changes that have been made, thus greatly simplifying his work when looking up the routing, rating, &c., to any particular point, and thus also avoiding the great liability of making mistakes that existed under the old plan.

From the foregoing description it will be seen that I have provided a tariff which will never involve more than a collection of one set of sheets covering the data required, and this set of sheets will be at all times up to date with respect to revisions or changes, and each of the data will have associated with it in position for ready inspection a reference to the authority establishing it and the date upon which it became effective. Moreover, by the nature of the tariff it is rendered perpetual or continuous by reason of the ready substitution of new sheets for old ones, and by having, in connection with such replaceable tariff-sheets, the collateral matter as to the date and authority for establishing the respective data these facts are continuously preserved along with the different ratings, &c., and notwithstanding the continuous changes which are being effected in the tariff as a whole it is practicable at all times to consult not only the actual prevailing rates, &c., at any moment without necessity for cross references or searching through revision-sheets, but it is likewise practicable at all times to know the dates on which rates are established in adjusting claims for errors in charges.

The advantage of my invention will be appreciated from the comparison of the complete constantly-revised tariff, having all data associated with it, with that which has heretofore been used—to wit, a periodically-reprinted tariff-book, together with a large file of revision-sheets, through every one of which a search must be made each time a rate is looked up in order to ascertain whether any rate in the book has been changed by a revision-sheet.

While I have shown my invention as applied to a tariff-sheet, it is obvious that it may also be applied to what is known in railroading as "division-sheets," "freight-classifications," &c., wherever information is issued by the roads in which corrections are from time to time made and authority for such corrections has to be furnished with the correction.

I have shown in Fig. II, under the words "Authority for changes," a column, marked "Special," for containing the authority if the rate given is a special rate, and I have also shown a column, marked "Commodities," for containing information regarding commodity-rates.

I claim as my invention—

1. A perpetual or continuous tariff comprising a number of separable or replaceable sheets containing data such as routings, rates, &c., for which the tariff is issued, and the columns containing references to authority, dates, or other collateral entries to be associated with the data of the tariff, substantially as and for the purposes set forth.

2. A perpetual or continuous tariff for railways, &c., comprising a plurality of separable and replaceable sheets containing the tariff data and also containing in the form, spaces for the introduction of matter to be added or deducted from time to time, such as references to authorities, dates or arbitraries, &c., whereby corrections may be made in the forms, and new corrected sheets containing current changes may be substituted at will and thus keep the tariff up to date without reprinting other than the sheet immediately affected by the changes, substantially as herein explained.

AMOS W. STANDING.

In presence of—
N. V. ALEXANDER,
STANLEY STONER.